United States Patent [19]

Shin et al.

[11] Patent Number: 5,398,231
[45] Date of Patent: Mar. 14, 1995

[54] OPTICAL INFORMATION RECORDING SUBSTRATE AND METHOD OF MAKING THEREOF

[75] Inventors: Yuaki Shin; Takashi Ishiguro; Emiko Hamada; Keiichi Kagawa, all of Tokyo, Japan

[73] Assignee: Taiyo Yuden Co., Ltd., Tokyo, Japan

[21] Appl. No.: 792,591

[22] Filed: Nov. 15, 1991

[30] Foreign Application Priority Data

Nov. 17, 1990 [JP] Japan .................................. 2-312067
Aug. 10, 1991 [JP] Japan .................................. 3-224623

[51] Int. Cl.⁶ .......................................... G06K 19/06
[52] U.S. Cl. .................................. 369/275.4; 369/273
[58] Field of Search ............... 369/272, 273, 274, 280, 369/283, 287, 288, 275.4

[56] References Cited

U.S. PATENT DOCUMENTS

| | | | |
|---|---|---|---|
| 4,066,268 | 1/1978 | Borchard et al. | 369/287 |
| 4,277,071 | 7/1981 | Birt et al. | 369/84 |
| 4,341,952 | 7/1982 | John et al. | 369/273 |
| 4,967,286 | 10/1990 | Nomuia et al. | 358/342 |

FOREIGN PATENT DOCUMENTS

| | | |
|---|---|---|
| 0329122 | 2/1989 | European Pat. Off. . |
| 61-34613 | 10/1986 | Japan . |
| 63-181119 | 11/1988 | Japan . |

*Primary Examiner*—Paul M. Dzierzynski
*Assistant Examiner*—Don Wong
*Attorney, Agent, or Firm*—Oblon, Spivak, McClelland, Maier, & Neustadt

[57] ABSTRACT

An optical information recording substrate having a legible matter formed in a groove area thereof or a pit array area thereof, wherein the legible matter includes a plurality of grooves or pit arrays being partially different in the breadth or depth thereof. The grooves or arrays may be partially dislocated in the radial direction of the optical information recording substrate from a predetermined track. The visually legible matter may include a plurality of laser generated pit arrays wherein remaining portions of the legible matter have a plurality of continuous grooves formed therein. The legible matter may also include a plurality of continuous grooves wherein remaining portions of the legible matter includes a plurality of laser generated pit arrays formed therein.

4 Claims, 5 Drawing Sheets

OPTICAL INFORMATION RECORDING SUBSTRATE AND METHOD OF MAKING THEREOF

BACKGROUND OF THE INVENTION

1. Field of the Invention

The present invention relates to an optical information recording substrate on which visually comprehensible legible matter is formed and a method of making thereof.

2. Discussion of the Background

Conventionally, a substrate for composing an optical record disc such as a compact disc, is produced by a stamper made of a primary disc.

In such a substrate for producing an optical disc, legible matter (hereinafter a mark) is formed on an area outside of a recording area thereof, for identifying, for instance, the contents of a recording or production number. As a method of forming the mark, a method is known, for instance, wherein the mark is physically made at the inner periphery of the stamper for producing the optical information recording substrate by a punch or by a marking-off pin, or a method is known disclosed in Japanese Unexamined Utility Model Publication No. 181119/1988, wherein the mark is provided on the stamper by an ultrasonic machining.

The substrate is formed using the stamper provided with the mark, by injection molding or the like.

However, in the method of marking the mark by the conventional technology, especially when the mark is produced on the stamper by a physical method, burrs and shavings are generated, which impairs the record or the play back portion of the substrate. As the result, in the optical record disc utilizing the substrate produced by such method, errors are generated in the recording or the play back signal.

Furthermore as is described in the conventional technology, when the mark is physically produced on the stamper, a recess is generated on the surface thereof by physical force. As the result, when the substrate for the optical record disc produced by such a stamper is utilized, in forming another layer on the substrate, defects such as nonuniformity of film thickness or a cometary defect in the layer formation by spin coating method, are generated. In the case of the ultrasonic machining, it is necessary to provide a tool for the ultrasonic machining, which increases the production cost thereof.

SUMMARY OF THE INVENTION

In view of the above problems of the conventional technology, it is an object of the present invention to provide an optical information recording substrate which has little influences on characteristic values as an optical record disc which is caused by the mark formation on the stamper. It is another object of the present invention to provide a method of making the optical information recording substrate in which the surface of the stamper is not impaired, a protrusion or recess is not formed and the mark is easily formed.

According to an aspect of the present invention, there is provided an optical information recording substrate having a legible matter formed in a groove area thereof or a pit array area thereof, wherein the legible matter comprises a plurality Of grooves or pit arrays which are partially different in terms of the breadth or depth thereof.

According to another aspect of the present invention there is provided an optical information recording substrate having a legible matter formed in a groove area thereof or a pit array area thereof, wherein the legible matter comprises a plurality of grooves or pit arrays, the tracks of which are partially dislocated in the radial direction of the optical information recording substrate from a predetermined track.

According to another aspect of the present invention there is provided an optical information recording substrate having visually comprehensible legible matter formed in a groove area thereof or a pit array area thereof, wherein the legible matter comprises a plurality of pit arrays, 17 the other portion of which a plurality of continuous grooves are formed.

According to another aspect of the present invention there is provided an optical information recording substrate having visually comprehensible legible matter formed in a groove area thereof or a pit array area thereof, wherein the legible matter comprises a plurality of continuous grooves, 17 the other portion of which a plurality of pit arrays are formed.

According to another aspect of the present invention there is provided a method of making an optical information recording substrate, wherein a plurality of grooves or a plurality of pit arrays are formed by irradiating laser beam on a primary disc on which a photo resist is made and the optical recording substrate is formed by using a stamper made of the primary disc, characterized in that a legible matter is produced by partially changing a power density or a size or a shape of a beam spot of the laser beam, or partially dislocating an irradiated location of the laser beam in the radial direction of the optical information recording substrate when the plurality of grooves or the plurality of pit arrays are formed on the primary disc.

According to another aspect of the present invention there is provided a method of making an optical information recording substrate, wherein a plurality of grooves or a plurality of pit arrays are formed by irradiating a laser beam on a primary disc on which a photo resist is made and the optical recording substrate is formed by using a stamper made of the primary disc, characterized in that visually comprehensible legible matter, composed of a portion of the plurality of grooves or the plurality of pit arrays is produced by intermittently irradiating partially the laser beam for forming grooves, or by continuously irradiating partially the laser beam for forming pit arrays when the plurality of grooves or the plurality of pit arrays are formed on the primary disc.

According to an optical information recording substrate of the first and the second embodiment of the invention, an identifiably different portions which is optically different with the other portions is formed, by partially changing the width or the depth of continuous grooves or pit arrays, or by partially dislocating the tracks thereof. Accordingly, by aggregating of these portions, a legible mark is formed.

Furthermore, as for the groove or the pit array, although the width or the depth thereof is partially changed, or the track is partially dislocated, since the continuity thereof is maintained, tracking thereof is possible along the groove or the pit array passing through the portions wherein the mark is formed, in the recording of the information in the optical information recording carrier or the playing back thereof.

Furthermore, according to the an optical information recording substrate of the third and the fourth embodiments of the invention, identifiably different portions which optically differ from other portions can be formed, by partially forming pit arrays or continuous grooves in parts of the continuous grooves or the pit arrays, respectively. Accordingly, by aggregating the portions a legible mark can be formed.

Furthermore, the above pit array or the continuous groove can be tracked along the groove or pit array through the portion wherein the mark is formed, as in the continuous grooves or pit arrays before and after the mark forming portion, in the recording of information on the optical information recording carrier or the playing back thereof.

According to a method of making the optical information recording substrate of the first and the second inventions, in order to change the sectional shape of the groove or pit array, a laser beam is utilized. The mark is formed on the primary disc by (partially) changing the power density or a size or a shape of a beam spot of the laser beam, or by dislocating the laser beam. This mark can be formed on the substrate by using the stamper made of the primary disc. Accordingly, it is possible to easily form the mark by utilizing the laser beam which is originaly used for forming pits or grooves in the record portion of the substrate. At that occasion, no physical force is applied on the primary disc nor the stamper. Therefore no protrusion or recess which influences on the spin coating of the surface of the substrate is produced by the stamper.

This is similar to a method of the making the optical information recording substrate of the third and the fourth embodiment of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1A:
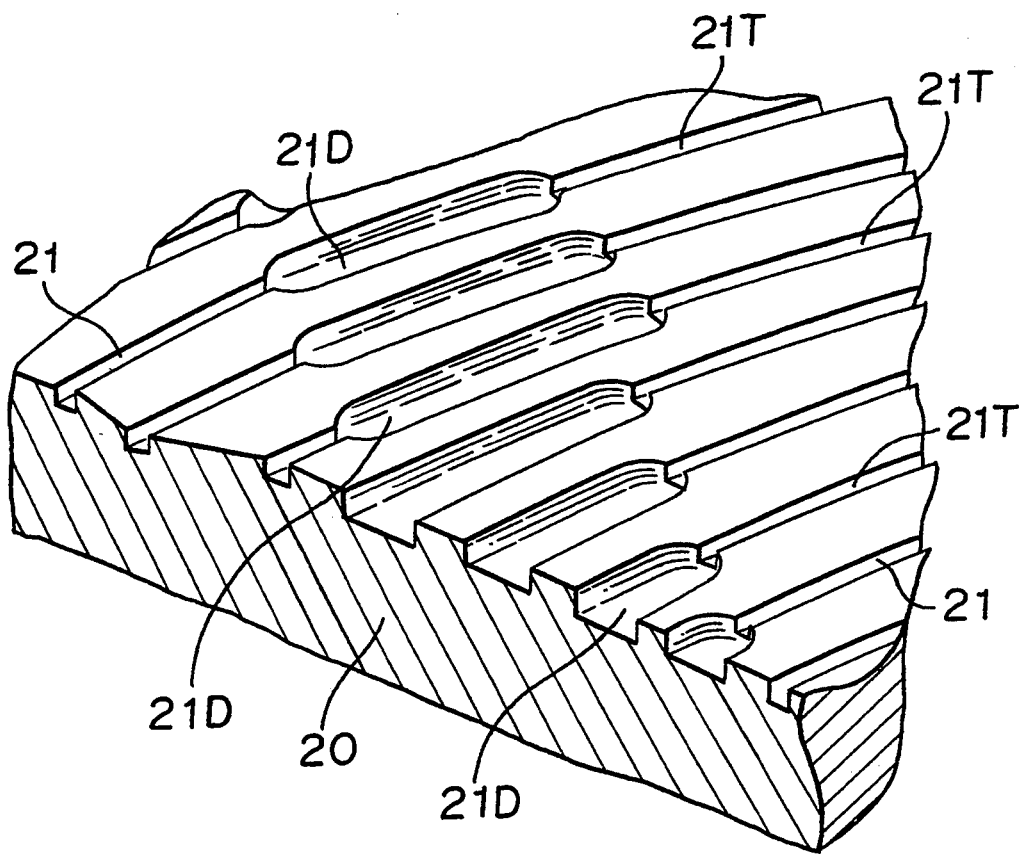
FIG. 1A is a partially enlarged view showing an embodiment of a detailed structure of the optical information recording substrate according to the present invention, and FIG. 1B, a total view thereof.

DESCRIPTION OF THE PREFERRED EMBODIMENTS following discussion, a detailed explanation will be given of the embodiments of the present invention referring to the drawings.

Figure 4:
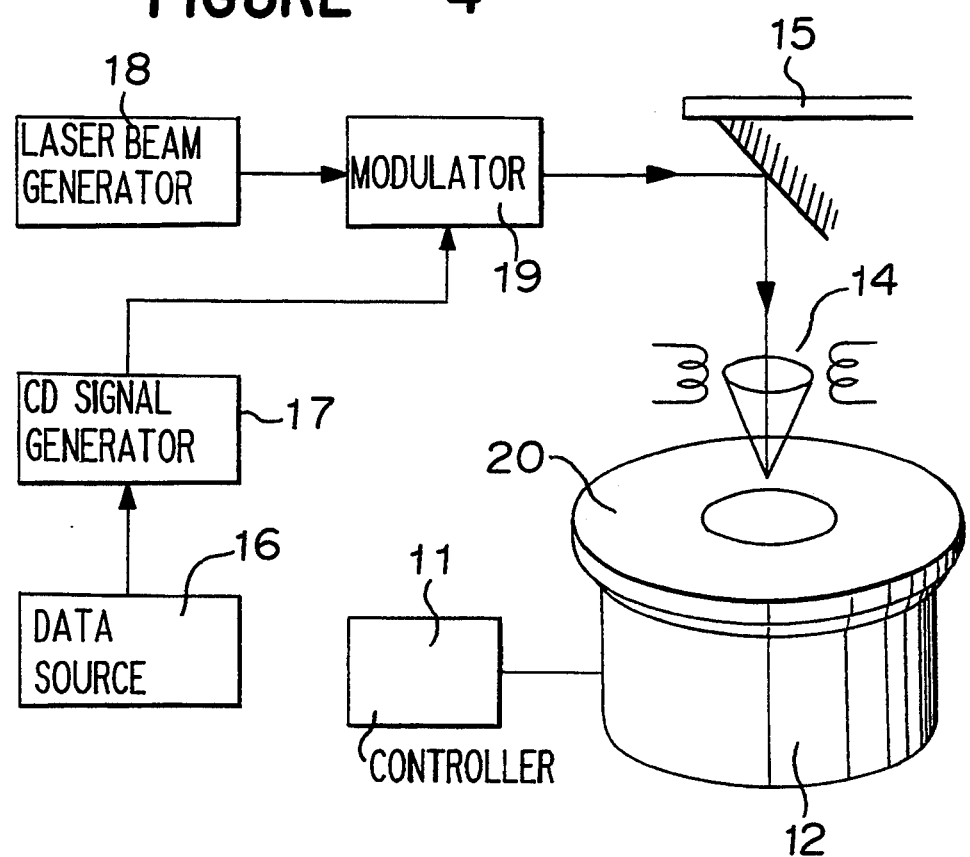
FIG. 4 is an outline schematic view showing an embodiment of a device for transcribing a mark on the primary disc for producing the stamper according to the present invention.

FIG. 4 shows a device for imprinting the mark on a primary disc for producing the substrate by the method of making the optical information recording substrate according to the present invention. In FIG. 4, the primary disc 20 is composed of a glass disc painted with photo resist by a spinner method or the like after polishing the surface thereof, is placed on the spindle motor 12. A laser spot of Ar laser or He—Cd laser or the like generated by the laser beam generator 18 is irradiated on the surface of the primary disc 20 and the surface thereof is exposed. Afterwards the grooves or the pit arrays are formed on the surface thereof by etching or the like.

In FIG. 4, reference numeral 11 designates a controller for controlling the revolution of the spindle motor 12, 14 denotes an object lens for focusing the laser beam by the laser beam generator 18 on the spot, and 15 indicates a feed mechanism for feeding the beam in the radial direction of the primary disc, by reflecting the laser beam and by moving it at a predetermined velocity (for instance, 1.6 $\mu$m per one revolution of the spindle motor). Numeral 19 designates a modulator which modulates the laser beam in accordance with signals generated by the CD signal generator 17 based on data of the data source 16.

Figure 5:
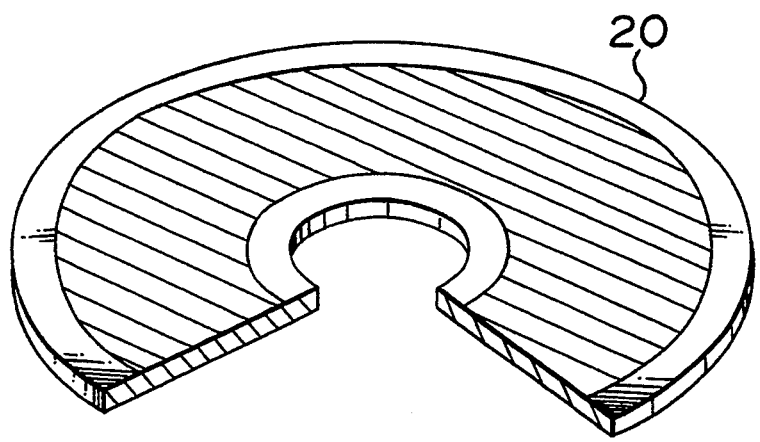
FIG. 5 is a partially sectional perspective view showing a primary disc for producing the optical information recording substrate on which the mark is formed.

According to the present invention, the mark on the optical information recording substrate imprinted by the above device can be formed in any area such as inner periphery or outer periphery of the primary disc, despite whether the area is in the information recording area of the primary disc 20 for producing optical information recording carrier as shown in FIG. 5 (in FIG. 5, hatched part), inasmuch as the continuous grooves or pit arrays are formed.

The grooves or the pit arrays are transcribed from a primary disc made as maintained above to a stamper.

The optical information recording substrate is formed using the stamper obtained as above indicated, by means of injection molding or the like. Generally speaking, in case of producing an optical information recording carrier capable of recording information by optical means from this substrate, a coloring agent is painted on the surface of the substrate, which forms a thin recording layer, and furthermore a reflection layer and a protection layer are formed on top of the recording layer. Furthermore, it is possible to produce from such a substrate, an optical information recording carrier of a ROM type, wherein optically legible information is recorded when it is produced, such as in a compact disc, and successive recording is impossible. Such optical information recording carrier can be produced generally by forming a reflection layer and a protection layer on the surface of the substrate.

Figure 1B:
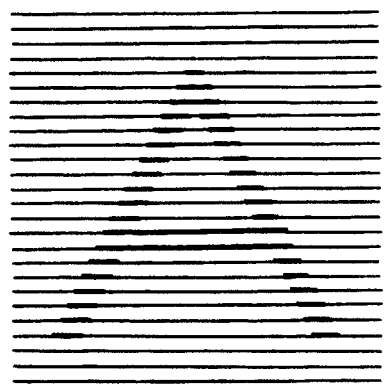
Figure 2A:
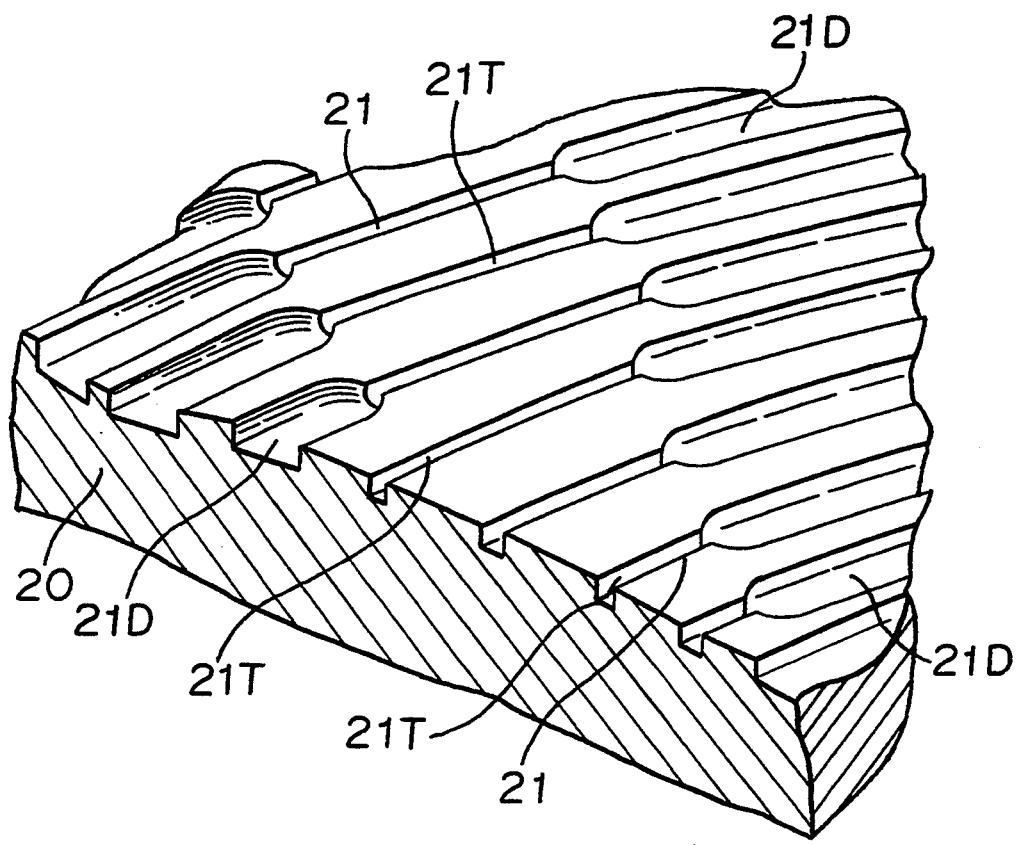
FIG. 2A is a partially enlarged view showing another embodiment of a detailed structure of the mark, and FIG. 2B, a total view thereof.
Figure 2B:
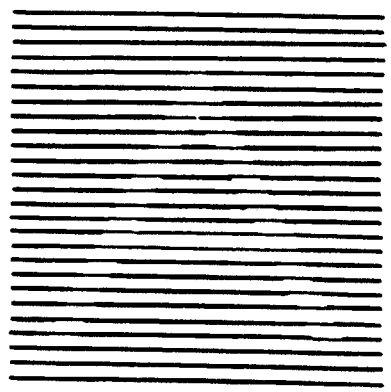

FIG. 1A shows an enlarged view of a part of the formed substrate. As apparent in the drawing, a profile of a visually legible letter such as an alphabetical a mark (in this example, in shape of "A" as an alphabet) is formed by thickening the plurality of grooves 21 (that is, the thick groove portion 21D). Furthermore, the groove width of the thick grooves 21D should be larger than that of the surrounding thin grooves 21T, so that the profile of the letter is recognizable to human eyes, as a whole. FIG. 1B shows an alphabet "A" which is formed by the thick grooves 21D. In contrast with FIGS. 1A and 1B, FIGS. 2A and 2B show an example in which the surrounding portion is formed by the thick grooves 21D and the letter portion is formed by the thin grooves 21T.

By the way, when the width of the groove or the pit is enlarged, the groove or the pit on the surface of the substrate is deepened by reason of the transcribability thereof in forming.

Figure 3A:
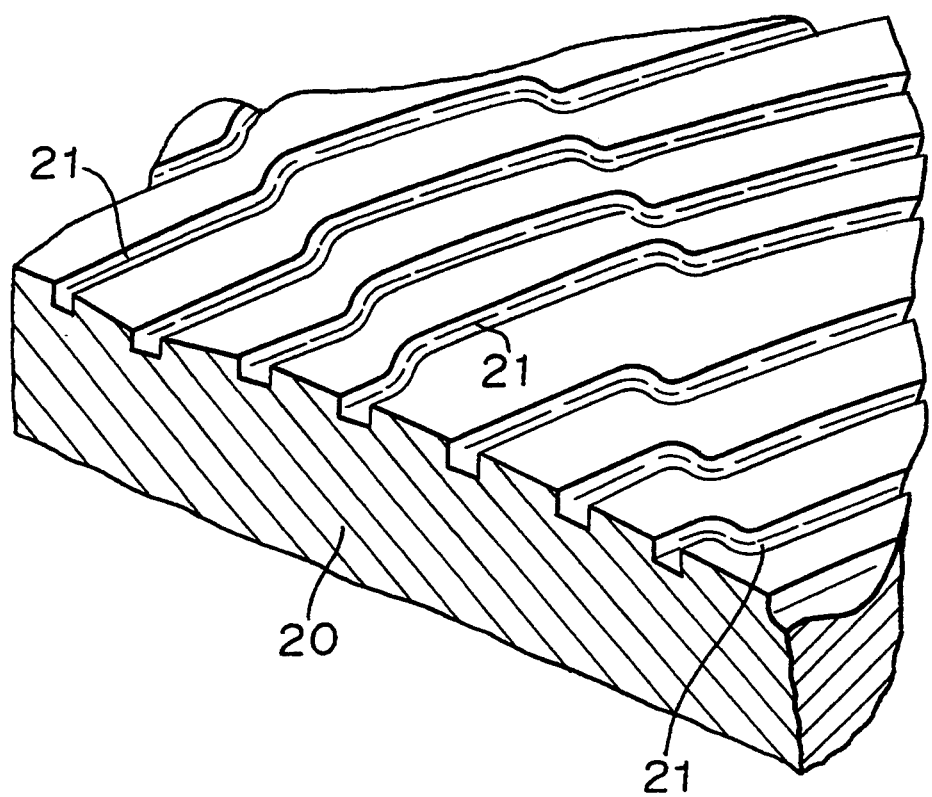
FIG. 3A is a partially enlarged view showing another embodiment of a detailed structure of the mark, and FIG. 3B, a total view thereof.
Figure 3B:
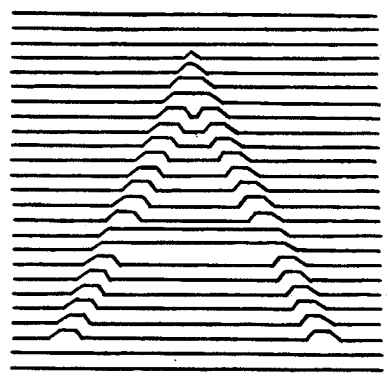

FIGS. 3A and 3B show a substrate formed by a stamper obtained by a method wherein the plurality of continuous grooves 21 are dislocated in the radial direction of the primary disc 20 in the letter portion, as a method of forming the letter without changing the width of the plurality of continuous grooves 21.

As a track of the groove to be dislocated 21, for instance, as shown in FIG. 3A, a track which is dislocated on the outer side or the inner side of the primary disc 20, is a general pattern. Furthermore, a track is proposed in which the track is dislocated alternatively and in away manner on the outer side or on the inner side of the primary disc 20, or the track is dislocated wavily only at a starting point and at an end point of the mark. Generally speaking, the dislocated track which clarifies the mark is most desirable. However the dislocated track is pertinently determined also considering the request of simplification for the production procedure.

Figure 6:
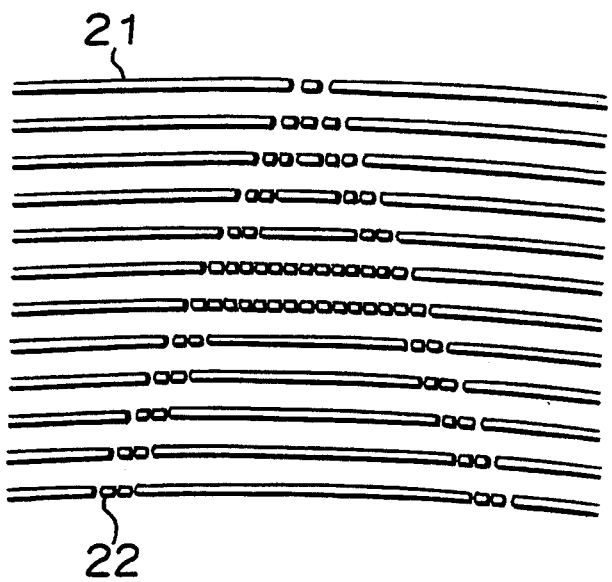
FIG. 6 is a partially enlarged plan view showing another embodiment of the detailed structure of the mark.

FIG. 6 shows an example wherein the intermittent pit arrays 22 are arranged in the midst of the continuous grooves 21, and the mark is formed by aggregating the pit arrays 22. Conversely, it is possible to form the mark by aggregating the continuous grooves 21, by arranging continuous grooves 21 in the midst of the intermittent pit arrays 22. The substrate is produced by such a stamper which is produced by such a primary disc, the method of production of which is basically the same as the above method. However, instead of dislocating the laser beam or changing the power thereof, the continuous grooves are partially replaced with the pit arrays, or the pit arrays are partially replaced with the continuous grooves.

As mentioned above, according to the present invention, in the grooves or pit arrays for forming the mark on the optical information recording substrate, the continuity thereof is maintained throughout the portion wherein the mark is formed, and the tracking thereof is possible. Therefore the mark can be formed at any area in spite of whether it is in the record area or not. It is possible to record information and play back the recorded information at the area on a recording carrier wherein the mark is formed. Furthermore, when the mark is formed at the outside of the record area, it is possible to perform the tracking control by moving an optical pick up outside of the record area, by recording a tracking servo information such as an ATIP information.

As apparent in the above explanation, according to an optical information recording substrate of the present invention, it is possible to form another layer on the substrate without causing errors in recording or in playing back signals, caused by the mark formation, since no flaw is generated in the record or the play back area.

Furthermore in the grooves or the pit arrays for forming the mark, the continuity for tracking is maintained through the mark forming portion, and the continuous tracking is possible around the grooves or the pit arrays. Therefore the location for forming mark is not restricted, and the mark can be formed at any location on the recording carrier.

Furthermore, in the method of making the optical information recording substrate according to the present invention, no flaw is caused on the surface of the stamper, and no protrusion or recess is caused. Therefore no corresponding protrusion or recess which influences on the spin coating on the substrate is formed by the stamper. Furthermore, it is possible to easily form the mark on the primary disc for forming the stamper, by using the laser beam device for forming originally the pits or the grooves on the record or on the play back area of the optical information recording carrier. Therefore it is not necessary to provide another working device, which is economically enforceable.

We claim:

1. An optical information recording substrate having visually comprehensible legible matter formed in one of a groove area thereof and a pit array area thereof, wherein the legible matter comprises one of a plurality of laser generated grooves and pit arrays which are at least partially different in with respect to one of breadth and depth thereof.

2. An optical information recording substrate having visually comprehensible legible matter formed in one of a groove area thereof and a pit array area thereof, wherein the legible matter comprises one of a plurality of laser generated grooves and pit arrays having tracks partially dislocated in the radial direction of the optical information recording substrate from a predetermined track.

3. An optical information recording substrate having visually comprehensible legible matter formed in one of a groove area thereof and a pit array area thereof, wherein the legible matter comprises a plurality of laser generated pit arrays, and wherein remaining portions of the legible matter have a plurality of continuous grooves formed therein.

4. An optical information recording substrate having visually comprehensible legible matter formed in one of a groove area thereof and a pit array area thereof, wherein the legible matter comprises a plurality of continuous grooves, and wherein remaining portions of the legible matter comprise a plurality of laser generated pit arrays formed therein. wherein remaining portions of the legible matter includes a plurality of laser generated pit arrays formed therein.

* * * * *